US012028320B2

(12) United States Patent
Xiong et al.

(10) Patent No.: US 12,028,320 B2
(45) Date of Patent: *Jul. 2, 2024

(54) MECHANISM TO REDUCE SERVERLESS FUNCTION STARTUP LATENCY

(71) Applicant: Huawei Cloud Computing Technologies Co., Ltd., Gui'an New District (CN)

(72) Inventors: Ying Xiong, Bothell, WA (US); Farhad P. Sunavala, San Ramon, CA (US); Hong Zhang, Palo Alto, CA (US)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,792

(22) Filed: Jan. 20, 2023

(65) Prior Publication Data
US 2023/0155982 A1 May 18, 2023

Related U.S. Application Data

(63) Continuation of application No. 16/815,226, filed on Mar. 11, 2020, now Pat. No. 11,658,939, which is a
(Continued)

(51) Int. Cl.
*H04L 45/586* (2022.01)
*G06F 9/455* (2018.01)
(Continued)

(52) U.S. Cl.
CPC ...... *H04L 63/0272* (2013.01); *G06F 9/45558* (2013.01); *H04L 12/4641* (2013.01);
(Continued)

(58) Field of Classification Search
CPC . H04L 63/0272; H04L 12/4641; H04L 45/54; H04L 45/586; H04L 61/2517;
(Continued)

(56) References Cited

U.S. PATENT DOCUMENTS 9,209,979 B2   12/2015   Spiers et al.
9,407,607 B2   8/2016    Liu et al.
(Continued)

FOREIGN PATENT DOCUMENTS

CN   102598591 A   7/2012
CN   105657081 A   6/2016
(Continued)

OTHER PUBLICATIONS

Li Kang-shun et al., Anycast routing algorithm for networks load balance based on QoS, Application Research of Computers, 2010, with an English abstract total 5 pages.
(Continued)

*Primary Examiner* — David R Lazaro
*Assistant Examiner* — Berhanu Shitayewoldetadik
(74) *Attorney, Agent, or Firm* — Gregg Jansen

(57) ABSTRACT

A computer-implemented method for accessing user resources in a virtual private cloud (VPC) using a serverless function within a network architecture includes instantiating a first warm application container for hosting the serverless function. The first warm application container includes a runtime language library without function code of the serverless function. A virtual machine for hosting a Port Address Translation (PAT) gateway is instantiated. The PAT gateway includes a first interface to the VPC and a second interface to the first warm application container. In response to detecting a trigger event for triggering the serverless function, the function code of the serverless function is mounted within the first warm application container. During execution of the function code from the first warm application container, VPC-addressed network packets associated with the serverless function are routed to the VPC via the second interface and the first interface within the PAT gateway.

40 Claims, 9 Drawing Sheets

Related U.S. Application Data continuation of application No. PCT/CN2019/083334, filed on Apr. 19, 2019.

(60) Provisional application No. 62/784,134, filed on Dec. 21, 2018.

(51) Int. Cl.

| | |
|---|---|
| *G06F 15/16* | (2006.01) |
| *G06F 21/60* | (2013.01) |
| *H04L 9/30* | (2006.01) |
| *H04L 9/32* | (2006.01) |
| *H04L 9/40* | (2022.01) |
| *H04L 12/26* | (2006.01) |
| *H04L 12/28* | (2006.01) |
| *H04L 12/46* | (2006.01) |
| *H04L 15/16* | (2006.01) |
| *H04L 45/00* | (2022.01) |
| *H04L 61/2517* | (2022.01) |
| *H04L 67/10* | (2022.01) |
| *H04L 101/622* | (2022.01) |

(52) U.S. Cl.
CPC ............ *H04L 45/54* (2013.01); *H04L 45/586* (2013.01); *H04L 61/2517* (2013.01); *H04L 67/10* (2013.01); *G06F 2009/45562* (2013.01); *G06F 2009/45575* (2013.01); *G06F 2009/45595* (2013.01); *H04L 2101/622* (2022.05)

(58) Field of Classification Search
CPC ..... H04L 61/6022; H04L 67/10; H04L 67/02; G06F 9/45558; G06F 2009/45562; G06F 2009/45575; G06F 2009/45595; G06F 9/44521
USPC ........................................................ 726/15
See application file for complete search history.

(56) References Cited

U.S. PATENT DOCUMENTS

| | | | |
|---|---|---|---|
| 9,600,312 B2 | 3/2017 | Wagner | |
| 10,002,026 B1* | 6/2018 | Wagner | G06F 9/45558 |
| 10,021,196 B1 | 7/2018 | Akers et al. | |
| 10,135,675 B2* | 11/2018 | Yu | H04L 9/3213 |
| 10,320,750 B1* | 6/2019 | Brandwine | H04L 63/1433 |
| 10,397,136 B2* | 8/2019 | Hira | H04L 12/66 |
| 10,503,748 B1* | 12/2019 | Farrow | G06F 16/245 |
| 10,536,332 B1* | 1/2020 | Hussain | H04L 41/0806 |
| 10,649,768 B1* | 5/2020 | Resios | G06F 11/3664 |
| 10,719,367 B1* | 7/2020 | Kim | G06F 9/5044 |
| 10,725,763 B1 | 7/2020 | Chud | |
| 10,817,280 B1* | 10/2020 | Masrani | G06F 8/30 |
| 10,931,741 B1* | 2/2021 | Liguori | G06F 8/63 |
| 10,997,409 B1* | 5/2021 | Krishnamurthy | G06V 30/422 |
| 10,999,253 B2* | 5/2021 | Chand | H04L 47/28 |
| 11,038,778 B2* | 6/2021 | Govindaraju | H04L 67/34 |
| 11,038,847 B1* | 6/2021 | Das | H04L 63/18 |
| 11,088,926 B2* | 8/2021 | Zhang | H04L 41/5041 |
| 11,093,268 B2* | 8/2021 | Aronovich | G06F 9/45545 |
| 2003/0118002 A1* | 6/2003 | Bradd | H04L 29/12424 370/352 |
| 2013/0018765 A1 | 1/2013 | Fork et al. | |
| 2014/0317059 A1 | 10/2014 | Lad et al. | |
| 2015/0036535 A1 | 2/2015 | Mosko et al. | |
| 2015/0088982 A1* | 3/2015 | Johnson | H04L 67/34 709/203 |
| 2015/0188888 A1 | 7/2015 | Kang et al. | |
| 2015/0339136 A1* | 11/2015 | Suryanarayanan | G06F 9/455 718/1 |
| 2016/0218991 A1 | 7/2016 | Sharabi et al. | |
| 2016/0224360 A1* | 8/2016 | Wagner | G06F 9/45558 |
| 2016/0224785 A1* | 8/2016 | Wagner | G06F 21/552 |
| 2016/0274982 A1 | 9/2016 | Lad et al. | |
| 2016/0373405 A1 | 12/2016 | Miller et al. | |
| 2017/0177391 A1* | 6/2017 | Wagner | G06F 11/3668 |
| 2018/0062933 A1* | 3/2018 | Hira | H04L 63/20 |
| 2018/0063086 A1* | 3/2018 | Hira | G06F 11/2035 |
| 2018/0063087 A1* | 3/2018 | Hira | G06F 11/07 |
| 2018/0063193 A1* | 3/2018 | Chandrashekhar | H04L 63/029 |
| 2018/0113791 A1 | 4/2018 | Fink et al. | |
| 2018/0113793 A1 | 4/2018 | Fink et al. | |
| 2018/0262467 A1* | 9/2018 | Jayawardena | H04L 63/0236 |
| 2018/0276086 A1 | 9/2018 | Lad et al. | |
| 2018/0314556 A1 | 11/2018 | Ghodsi et al. | |
| 2018/0367528 A1* | 12/2018 | Schwarz | H04L 9/0894 |
| 2019/0018715 A1* | 1/2019 | Behrendt | G06F 9/542 |
| 2019/0028552 A1* | 1/2019 | Johnson, II | H04L 67/02 |
| 2019/0075154 A1* | 3/2019 | Zhang | G06F 9/5072 |
| 2019/0079744 A1* | 3/2019 | Bosch | G06F 8/60 |
| 2019/0179678 A1* | 6/2019 | Banerjee | G06F 16/2379 |
| 2019/0182329 A1* | 6/2019 | Moss | G06N 20/20 |
| 2019/0278928 A1* | 9/2019 | Rungta | G06F 9/5077 |
| 2019/0324813 A1* | 10/2019 | Bogineni | G06F 9/4843 |
| 2019/0332483 A1 | 10/2019 | Natanzon et al. | |
| 2019/0339955 A1* | 11/2019 | Kuo | G06F 8/60 |
| 2019/0342397 A1* | 11/2019 | Laibson | H04L 43/12 |
| 2019/0347127 A1* | 11/2019 | Coady | G06F 11/3409 |
| 2020/0052982 A1* | 2/2020 | Nainar | G06F 9/44521 |
| 2020/0059370 A1* | 2/2020 | Abraham | H04L 12/4633 |
| 2020/0059420 A1* | 2/2020 | Abraham | G06F 9/5072 |
| 2020/0065124 A1* | 2/2020 | Chen | G06F 9/45558 |
| 2020/0073739 A1* | 3/2020 | Rungta | G06F 8/60 |
| 2020/0082095 A1* | 3/2020 | Mcallister | G06F 11/323 |
| 2020/0117434 A1* | 4/2020 | Biskup | G06F 9/445 |
| 2020/0120120 A1* | 4/2020 | Cybulski | H04L 63/083 |
| 2020/0127898 A1 | 4/2020 | Biran et al. | |
| 2020/0137125 A1* | 4/2020 | Patnala | G06F 21/64 |
| 2020/0150974 A1* | 5/2020 | Li | G06F 9/45558 |
| 2020/0150989 A1* | 5/2020 | Aronovich | G06F 9/45545 |
| 2020/0220924 A1* | 7/2020 | Yang | H04L 67/32 |
| 2021/0073080 A1 | 3/2021 | Natanzon et al. | |
| 2021/0349749 A1* | 11/2021 | Guha | H04L 43/0882 |
| 2022/0006708 A1* | 1/2022 | Zhang | G06F 9/5072 |
| 2022/0036794 A1* | 2/2022 | Mandle | G02F 1/133514 |
| 2022/0038355 A1* | 2/2022 | Chen | G06F 9/542 |
| 2022/0046061 A1* | 2/2022 | Janakiraman | H04L 63/20 |

FOREIGN PATENT DOCUMENTS

| | | | | |
|---|---|---|---|---|
| CN | 106663034 A | 5/2017 | | |
| CN | 106789667 A | 5/2017 | | |
| CN | 108270858 A | 7/2018 | | |
| CN | 108415710 A | 8/2018 | | |
| CN | 108845878 A | 11/2018 | | |
| CN | 112384895 A | 2/2021 | | |
| EP | 3475856 B1 | 3/2021 | | |
| EP | 3475856 B1 * | 3/2021 | ........... | G06F 9/5072 |
| EP | 3848805 A1 * | 7/2021 | ........... | G06F 9/5072 |
| EP | 3848805 A1 | 7/2021 | | |
| WO | 2016126731 A1 | 8/2016 | | |
| WO | WO-2016126731 A1 * | 8/2016 | ............ | G06F 21/53 |

OTHER PUBLICATIONS

Nathan Malishev, "How to manage Lambda VPC cold starts and deal with that killer latency",Jun. 14, 2018, https://www.freecodecamp.org/news/lambda-vpc-cold-starts-a-latency-killer-5408323278dd, total 10 pages.

AWS re:Invent 2017 Keynote—Tuesday Night Live with Peter DeSantis, https://www.youtube.com/watch?v=dfEcd3zqPOAandt=4661s, begin from the time: 1:17:41, total 3 pages.

Zhuyahui et al., Virtual Machine Scheduling Algorithm for Resource Utilization Balanced in Cloud Data Center, https://d.wanfangdata.com.cn/periodical/xxwxjsjxt201702009, 2017, only the abstract with English translation total 1 page.

"Connecting outbound networking to resources in a VPC", aws, 2024, https://docs.aws.amazon.com/lambda/latest/dg/configuration-vpc.html, total 13 pages.

(56) References Cited

OTHER PUBLICATIONS

Garrett Stephens, "Dissecting AWS s Virtual Private Cloud (VPC) |Private IP Addresses, Public IP Addresses,Internet Gateways, Route Tables, NAT Gateways,Security Groups and Network ACLs", A snapshot writeup from Simplilearn s AWS Solution Architect Tutorial, Jun. 29, 2017, total 25 pages.

Jeremy, "Mixing VPC and Non-VPC Lambda Functions for Higher Performing Microservices", Friday, Jul. 6, 2018, https://www.jeremydaly.com/mixing-vpc-and-non-vpc-lambda-functions-for-higher-performing-microservices/, total 21 pages.

Serverless Architectures with AWS Lambda Overview and Best Practices, Nov. 2017, © 2017, Amazon Web Services, Inc., https://d1.awsstatic.com/whitepapers/serverless-architectures-with-aws-lambda.pdf, total 50 pages.

Jeff Barr, "New—Access Resources in a VPC from Your Lambda Functions", AWS News Blog, Feb. 11, 2016, https://aws.amazon.com/cn/blogs/aws/new-access-resources-in-a-vpc-from-your-lambda-functions/, total 2 pages.

"AWS re:Invent 2017: Another Day, Another Billion Flows (NET405)", YouTube, https://www.youtube.com/watch?v=8gc2DgBqo9U, total 2 pages.

"AWS re:Invent 2018: Amazon VPC: Security at the Speed of Light (NET313)", YouTube, https://www.youtube.com/watch?v=UP7wDBjZ37o, total 2 pages.

P. Srisuresh et al., "Traditional IP Network Address Translator (Traditional NAT)", Request for Comments: 3022, Jan. 2001, total 16 pages.

"AWS re:Invent 2018: [New Launch] AWS Transit Gateway & Transit VPCs, Ref Arch for Many VPCs (NET402)", YouTube, https://www.youtube.com/watch?v=ar6sLmJ45xs, total 2 pages.

* cited by examiner

MECHANISM TO REDUCE SERVERLESS FUNCTION STARTUP LATENCY

CROSS REFERENCE TO RELATED APPLICATIONS

This application is a continuation application of and claims priority to pending U.S. patent application Ser. No. 16/815,226, filed on Mar. 11, 2020, entitled "Mechanism to Reduce Serverless Function Startup Latency", which was a continuation application of and claims priority to International Application No. PCT/CN2019/083334, filed Apr. 19, 2019, which claims priority to U.S. Provisional Application 62/784,134, filed Dec. 21, 2018, and entitled "Mechanism to Reduce Serverless Function Startup Latency," the contents of which are hereby incorporated by reference in their entirety.

TECHNICAL FIELD

The present disclosure is related to serverless computing. Some aspects relate to mechanisms to reduce serverless function startup latency.

BACKGROUND

Serverless computing is associated with a network architecture where a user of the network architecture relies on network-based servers, network infrastructure, and operating systems provided as a service and managed by a network provider. The user of the network architecture can take advantage of serverless computing by creating, managing, and deploying applications that can scale on demand and using network resources managed by the network provider.

In serverless computing, the compute platform automatically manages and creates the underlying compute resources to host and run the function code of a serverless function. Examples of serverless computer platforms include Amazon Web Services (AWS) Lambda, Google Cloud Functions, Azure Functions, and so forth. One of the challenges in serverless computing is when a user's serverless function needs to access resources (e.g., database resources, storage resources, and so forth) in a virtual private cloud (VPC) of the user. More specifically, conventional techniques for accessing the user's VPC resources by the serverless function can take tens of seconds, which is not an optimal latency in a serverless computing environment.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to a first aspect of the present disclosure, there is provided a computer-implemented method for accessing user resources in a virtual private cloud (VPC) using a serverless function within a network architecture. The method includes instantiating a first warm application container for hosting the serverless function, the first warm application container including a runtime language library without function code of the serverless function. A virtual machine is instantiated for hosting a Port Address Translation (PAT) gateway. The PAT gateway includes a first interface to the VPC and a second interface to the first warm application container. In response to detecting a trigger event for triggering the serverless function, the function code of the serverless function is mounted within the first warm application container. During execution of the function code from the first warm application container, VPC-addressed network packets associated with the serverless function are routed to the VPC via the second interface and the first interface within the PAT gateway.

In a first implementation form of the method according to the first aspect as such, a route entry is inserted in a network routing table in the first warm application container. The route entry modifies media access control (MAC) destination addresses of the VPC-addressed network packets to a MAC address of the second interface.

In a second implementation form of the method according to the first aspect as such or any preceding implementation form of the first aspect, the route entry modifies the MAC destination addresses of the VPC-addressed network packets from a MAC address of the VPC or a MAC address of a virtual router coupled to the VPC to the MAC address of the second interface.

In a third implementation form of the method according to the first aspect as such or any preceding implementation form of the first aspect, the first warm application container is within a first sub-network, the VPC is within a second sub-network, and the method further includes routing the VPC-addressed network packets from the first warm application container in the first sub-network to the virtual machine via the second interface.

In a fourth implementation form of the method according to the first aspect as such or any preceding implementation form of the first aspect, the VPC-addressed network packets are routed from the virtual machine to the VPC in the second sub-network via the first interface to the VPC.

In a fifth implementation form of the method according to the first aspect as such or any preceding implementation form of the first aspect, configuration information for configuring the serverless function is received. In response to determining, based on the configuration information, that the serverless function is to access the VPC, the virtual machine is instantiated. The second interface is attached within the virtual machine, to the first warm application container. The first interface is attached within the virtual machine to the VPC.

In a sixth implementation form of the method according to the first aspect as such or any preceding implementation form of the first aspect, the virtual machine is coupled to the VPC via a network switch, and the method further includes inserting a route entry in a network routing table in the network switch, the route entry modifying media access control (MAC) destination address of the VPC-addressed network packets to a MAC address associated with the second interface.

In a seventh implementation form of the method according to the first aspect as such or any preceding implementation form of the first aspect, the VPC-addressed network packets associated with the serverless function running in the first warm application container and VPC-addressed network packets associated with a serverless function running in a second warm application container are received via the second interface of the PAT gateway.

In an eighth implementation form of the method according to the first aspect as such or any preceding implementation form of the first aspect, a source Internet Protocol (IP) address of the VPC-addressed network packets originating from the first warm application container is modified to a source IP address of the PAT gateway associated with a first port. A source IP address of the VPC-addressed network packets originating from the second warm application container is modified to a source IP address of the PAT gateway associated with a second port. The VPC-addressed network packets originating from the first and second warm application containers are forwarded to the VPC via the first interface of the PAT gateway.

According to a second aspect of the present disclosure, there is provided a system including a memory that stores instructions and one or more processors in communication with the memory. The one or more processors execute the instructions to instantiate a first warm application container for hosting a serverless function, the first warm application container including a runtime language library without function code of the serverless function. A virtual machine for hosting a Port Address Translation (PAT) gateway is instantiated. The PAT gateway includes a first interface to the virtual private cloud (VPC) and a second interface to the first warm application container. In response to detecting a trigger event for triggering the serverless function, the function code of the serverless function is mounted within the first warm application container. During execution of the function code from the first warm application container, VPC-addressed network packets associated with the serverless function are routed to the VPC via the second interface and the first interface within the PAT gateway.

In a first implementation form of the system according to the second aspect as such, the one or more processors execute the instructions to insert a route entry in a network routing table in the first warm application container, the route entry modifying media access control (MAC) destination addresses of the VPC-addressed network packets to a MAC address of the second interface.

In a second implementation form of the system according to the second aspect as such or any preceding implementation form of the second aspect, the route entry modifies the MAC destination addresses of the VPC-addressed network packets from a MAC address of the VPC or a MAC address of a virtual router coupled to the VPC to the MAC address of the second interface.

In a third implementation form of the system according to the second aspect as such or any preceding implementation form of the second aspect, the first warm application container is within a first sub-network, the VPC is within a second sub-network, and the one or more processors execute the instructions to route the VPC-addressed network packets from the first warm application container in the first sub-network to the virtual machine via the second interface.

In a fourth implementation form of the system according to the second aspect as such or any preceding implementation form of the second aspect, where the one or more processors execute the instructions to route the VPC-addressed network packets from the virtual machine to the VPC in the second sub-network via the first interface to the VPC.

In a fifth implementation form of the system according to the second aspect as such or any preceding implementation form of the second aspect, where the one or more processors execute the instructions to receive configuration information for configuring the serverless function. In response to determining, based on the configuration information, that the serverless function is to access the VPC, the virtual machine is instantiated, the second interface is attached within the virtual machine to the first warm application container, and the first interface is attached within the virtual machine to the VPC.

In a sixth implementation form of the system according to the second aspect as such or any preceding implementation form of the second aspect, where the virtual machine is coupled to the VPC via a network switch, and the one or more processors execute the instructions to insert a route entry in a network routing table in the network switch. The route entry modifies media access control (MAC) destination address of the VPC-addressed network packets to a MAC address associated with the second interface.

In a seventh implementation form of the system according to the second aspect as such or any preceding implementation form of the second aspect, the one or more processors execute the instructions to receive via the second interface of the PAT gateway, the VPC-addressed network packets associated with the serverless function running in the first warm application container and VPC-addressed network packets associated with a serverless function running in a second warm application container.

In an eighth implementation form of the system according to the second aspect as such or any preceding implementation form of the second aspect, the one or more processors execute the instructions to modify a source Internet Protocol (IP) address of the VPC-addressed network packets originating from the first warm application container to a source IP address of the PAT gateway associated with a first port. A source IP address of the VPC-addressed network packets originating from the second warm application container is modified to a source IP address of the PAT gateway associated with a second port. The VPC-addressed network packets originating from the first and second warm application containers are forwarded to the VPC via the first interface of the PAT gateway.

According to a third aspect of the present disclosure, there is provided a non-transitory computer-readable medium storing instruction for accessing user resources in a virtual private cloud (VPC) using a serverless function within a network architecture, that when executed by one or more processors, cause the one or more processors to perform operations. The operations include instantiating a first warm application container for hosting the serverless function, the first warm application container including a runtime language library without function code of the serverless function. A virtual machine is instantiated for hosting a Port Address Translation (PAT) gateway. The PAT gateway includes a first interface to the VPC and a second interface to the first warm application container. In response to detecting a trigger event for triggering the serverless function, the function code of the serverless function is mounted within the first warm application container. During execution of the function code from the first warm application container, VPC-addressed network packets associated with the serverless function are routed to the VPC via the second interface and the first interface within the PAT gateway.

In a first implementation form of the non-transitory computer-readable medium according to the third aspect as such, where upon execution, the instructions further cause the one or more processors to perform operations including receiving via the second interface of the PAT gateway, the VPC-addressed network packets associated with the serverless function running in the first warm application container and VPC-addressed network packets associated with a serverless function running in a second warm application container. A source Internet Protocol (IP) address of the VPC-addressed network packets originating from the first warm application container is modified to a source IP address of the PAT gateway associated with a first port. A source IP address of the VPC-addressed network packets originating from the second warm application container is modified to a source IP address of the PAT gateway associated with a second port. The VPC-addressed network packets originating from the first and second warm application containers are forwarded to the VPC via the first interface of the PAT gateway.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
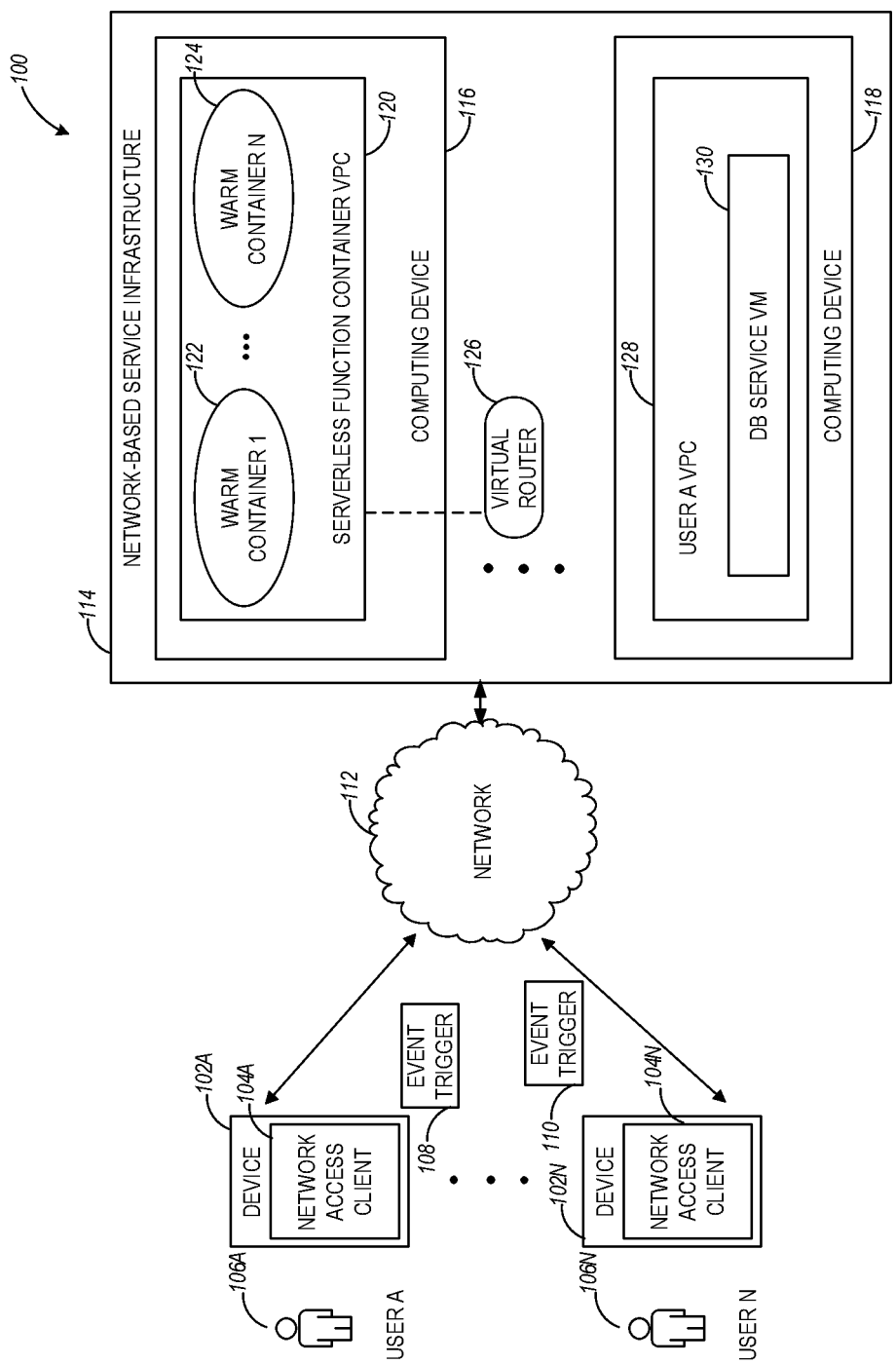
FIG. 1 is a high-level system overview of a network architecture using a serverless function container VPC, according to some example embodiments.

It should be understood at the outset that although an illustrative implementation of one or more embodiments are provided below, the disclosed systems and/or methods described with respect to FIGS. 1-9 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

As used herein, the term "network-based service infrastructure" includes a plurality of network devices providing on-demand computing capacity (e.g., via one or more virtual machines or other virtual resources running on the network devices) and storage capacity as a service to a community of end recipients (e.g., customers of the service infrastructure), where the end recipients are communicatively coupled to the network devices within the service infrastructure via a network. The customers of the service infrastructure can use one or more computing devices (or customer devices) to access and manage the services provided by the service infrastructure via the network. The customer devices, the network, and the network-based service infrastructure can be collectively referred to as a "network architecture." The customers of the service infrastructure can also be referred to as "users."

As used herein, the term "cold container" refers to an application container which is instantiated (i.e., started on an instance such as a virtual machine or a virtual private cloud running on a computing device) when a trigger event that uses functionalities of an application running on the container takes place. When the cold container is instantiated for a given application in response to the trigger even taking place, the container includes both function code associated with functionalities performed by the application as well as runtime language libraries and binaries for the function code. An example of a cold containers which are started when the event happens are application containers associated with Amazon Web Services (AWS). Latency for cold containers is in the range of 10 seconds.

As used herein, the term "hot container" refers to an application container which is up and running with the user function code and its runtime language library before the trigger takes place. The hot containers can remain active for certain time and then released after the function code execution completes. The hot containers require significant amount of wasted resources as the container with the function code and runtime library is active even when it has not been requested and it is not needed.

As used herein, the term "warm container" refers to an application container which can be instantiated and is running only with a runtime language library before the trigger even takes place (e.g., a runtime library for a programming language, such as Java Runtime library, Go Runtime library, Python Runtime library, and so forth). The warm containers do not have any function code when instantiated. The user function code can be dynamically mounted to the warm container when the trigger event arrives and unmounted from the warm container when the function (or application) associated with the mounted application code completes execution. In this regard, a warm container can run a User A's function at one time and run a User B's function at another time.

Prior art serverless computing solutions use cold containers (containers started when event occurs) or hot containers (containers already running with user's code). However, both of these approaches have drawbacks. For example, cold containers have a large startup time whilst hot containers cannot scale (e.g., if there are 50 million users and each user has 10 functions, then assuming 3 hot containers per function will result in a total of 50M*10*3=1.5 billion containers running all the time). Even though the latency is extremely low since the user code is already running, in networks using hot and cold containers it can be challenging for service providers to scale the use of computing resources and to provide a serverless platform.

Prior art serverless computing solutions for accessing a user's VPC have drawbacks. For example, Azure Functions and Google Cloud Functions do not allow their respective serverless functions to access resources in the user's VPC. If an Azure Function or Google Cloud Function needs to access resources in a private VPC, the resources can only be accessed using a public IP address. Amazon's AWS Lambda allows a serverless container to access private VPC resources by providing an Elastic Network Interface (ENI) to the container during the container creation. The ENI is from the VPC's private sub-network (or subnet) which allows the serverless container to access the VPC resources. However, as serverless containers scale, the use of public IP addresses in prior art solutions results in using IP addresses from the VPC subnet. When the VPC subnet runs out of IP addresses due to, e.g., a sudden burst of events, additional containers will not be created. A bigger disadvantage is the startup latency associated with using ENIs. For example, attaching an ENI to a container takes substantial time. Amazon's AWS acknowledges this drawback in user literature and advises users of delays as long as 8-10 seconds when accessing a VPC using ENI. This large delay is not acceptable for many applications. In this regard, conventional techniques for accessing a user's VPC using a serverless function do not provide a viable solution to instantiate a function container and set up a network connection to a resource in the user's VPC with extremely low latency (e.g., within one second).

Techniques disclosed herein for serverless function startup latency reduction use warm application containers, which can be up and running with a runtime language library before a serverless function trigger event takes place. As mentioned above, when instantiated, the warm container only includes application libraries/binaries and does not include the function code. The user function code is dynamically auto-mounted to the warm container when the serverless function trigger event arrives, and de-mounted from the warm container when the serverless function execution completes. Additionally, a proxy VM (or container) can be instantiated per user with a Port Address Translation (PAT) gateway (GW). The PAT GW container can be created before the user configures the serverless function and event trigger is received, or during the configuration time of the first serverless function of the user, which function requires access to the user's VPC (e.g., to access user database or other user resources in the VPC). Additionally, the PAT GW includes two interfaces, one to the user's network with the user's VPC and the other to the serverless container network that includes the warm container for hosting the serverless function code.

When the serverless function event trigger is detected, a route is inserted into the serverless container's network routing table using information dynamically obtained from the event information within the trigger (e.g., that certain packets may be routed to the user's VPC). The route entry can be used for redirecting VPC-addressed network packets to the tenant's PAT GW via one of the interfaces, and then routing the packets to the user's VPC via the second interface. This "insert" operation can take approximately 5 ms. The total container instantiation time is thus reduced to less than 100 ms as compared to the 10 second latencies seen with prior art solutions, such as the AWS Lambda which attaches an ENI to a container.

In contrast to existing solutions for accessing a user's VPC using a serverless function, techniques disclosed herein use warm containers that can be pre-configured only with a library/binary and without function code. Prior art solutions also do not use a proxy container implementing an address translation gateway with an interface for communicating in one sub-network (e.g., of the serverless function container) and a second interface that operates in another sub-network for communication with the VPC. Additionally, techniques disclosed herein allow for scaling of serverless containers, without taking IP addresses from the tenant's VPC subnet, thus avoiding the issue of running out of IP addresses due to a sudden burst of VPC-related events.

FIG. 1 is a high-level system overview of a network architecture 100 using a serverless function container VPC, according to some example embodiments. Referring to FIG. 1, the network architecture 100 can include a plurality of devices (e.g., user devices) 102A, . . . , 102N (collectively, devices 102) communicatively coupled to a network-based service infrastructure 114 via a network 112. The devices 102A, . . . , 102N are associated with corresponding users 106A, . . . , 106N and can be configured to interact with the network-based service infrastructure 114 using a network access client, such as one of clients 104A, . . . , 104N. The network access clients 104A, . . . , 104N can be implemented as web clients or application (app) clients.

Users 106A, . . . , 106N may be referred to generically as "a user 106" or collectively as "users 106." Each user 106 may be a human user (e.g., a human being), a machine user (e.g., a computer configured by a software program to interact with the devices 102 and the network-based service infrastructure 114), or any suitable combination thereof (e.g., a human assisted by a machine or a machine supervised by a human). The users 106 are not part of the network architecture 100 but are each associated with one or more of the devices 102 and may be users of the devices 102 (e.g., the user 106A may be an owner of the device 102A, and the user 106N may be an owner of the device 102N). For example, the device 102A may be a desktop computer, a vehicle computer, a tablet computer, a navigational device, a portable media device, or a smartphone belonging to the user 106A. Users 106A, . . . , 106N can use devices 102A, . . . , 102N to access services (e.g., serverless computing services) provided by the network-based service infrastructure 114. The serverless computing services can include instantiating and using virtual machines (VMs), virtual private clouds (VPCs), application containers (e.g., warm containers instantiated within a VPC), and so forth.

The network-based service infrastructure 114 can include a plurality of computing devices 116, . . . , 118. One or more of the computing devices within the infrastructure 114 (e.g., computing device 116) can include a serverless function container VPC 120. The serverless function container VPC 120 can be used to instantiate one or more containers, virtual machines or other computing resources. The computing resources instantiated within the VPC 120 can form multiple networks, and interconnection between the networks and between different resources within the VPC 120 can be performed via a virtual router (e.g., virtual router 126).

As illustrated in FIG. 1, the serverless function container VPC 120 can be used to instantiate a plurality of warm containers 122, . . . , 124. One or more of the computing devices 116, . . . , 118 (e.g., computing device 118) can be used to instantiate VPCs associated with users 106 (e.g., computing device 118 can be used to instantiate VPC 128 of user A 106A. The user A VPC 128 can include a virtual machine 130 running a database service associated with one or more databases of user A.

Any of the devices shown in FIG. 1 may be implemented in a general-purpose computer modified (e.g., configured or programmed) by software to be a special-purpose computer to perform the functions described herein for that machine, database, or device. As used herein, a "database" is a data storage resource that stores data structured as a text file, a table, a spreadsheet, a relational database (e.g., an object-relational database, a NoSQL database, a network or graph database), a triple store, a hierarchical data store, or any suitable combination thereof. Additionally, data accessed (or stored) via an application programming interface (API) or remote procedure call (RPC) may be considered to be accessed from (or stored to) a database. Moreover, any two or more of the devices or databases illustrated in FIG. 1 may be combined into a single machine, database, or device, and the functions described herein for any single machine, database, or device may be subdivided among multiple machines, databases, or devices.

The network 112 may be any network that enables communication between or among machines, databases, and devices (e.g., devices 102A, . . . , 102N and devices 116, . . . , 118 within the network-based service infrastructure 114). Accordingly, the network 112 may be a wired network, a wireless network (e.g., a mobile or cellular network), or any suitable combination thereof. The network 112 may include one or more portions that constitute a private network, a public network (e.g., the Internet), or any suitable combination thereof.

In some aspects, one or more of the users 106 can communicate event triggers 108, . . . , 110 to trigger functionalities associated with serverless functions running on one or more of the warm containers 122, . . . , 124. Techniques disclosed herein in connection with FIG. 2-FIG. 9 can be used to reduce serverless function startup latency in connection with serverless functions provided by the network-based service infrastructure 114 to the users 106.

Figure 2:
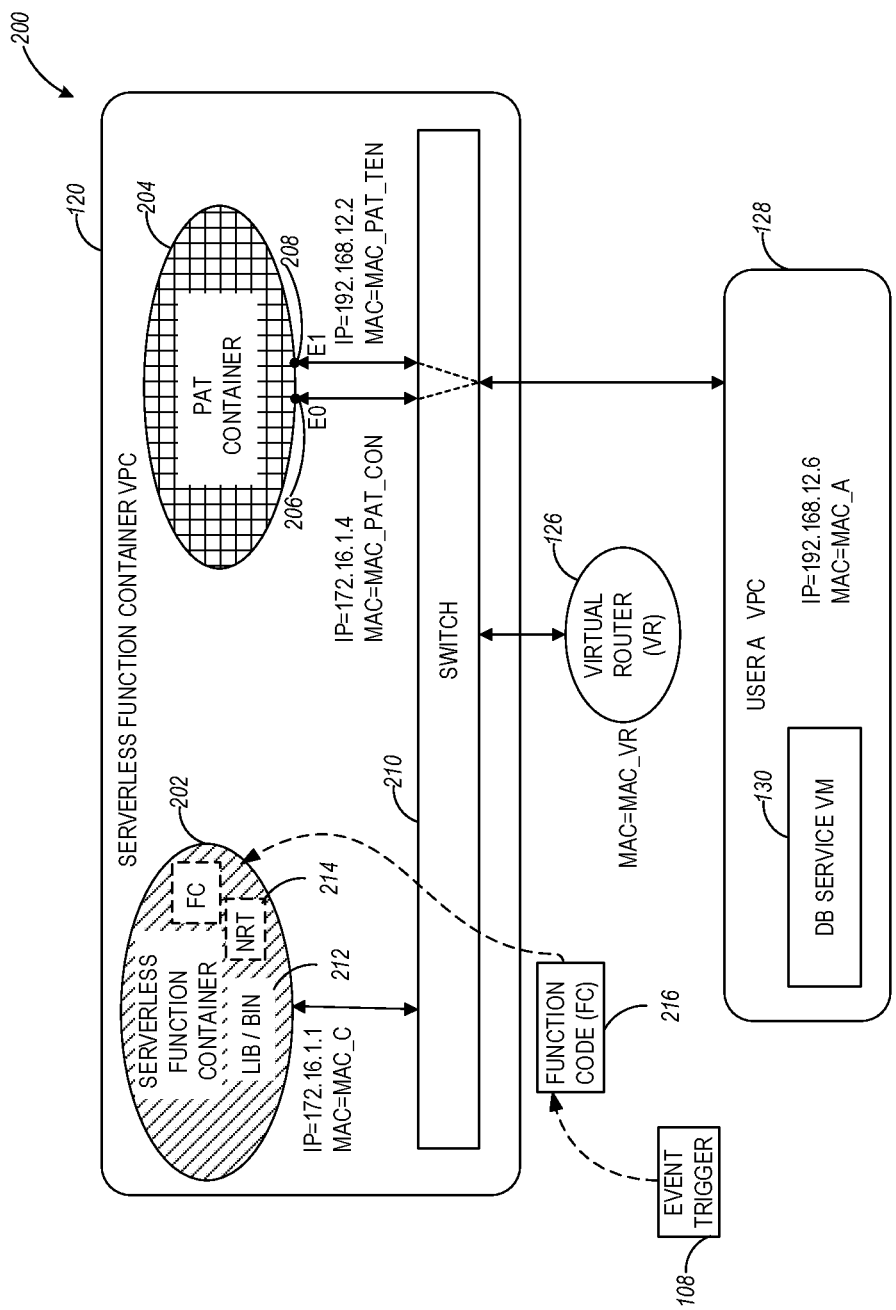
FIG. 2 is a block diagram illustrating a mechanism to reduce serverless function startup latency in a network architecture using a warm container and a proxy container executing a port address translation (PAT) gateway within a serverless function container VPC, according to some example embodiments.

FIG. 2 is a block diagram 200 illustrating a mechanism to reduce serverless function startup latency in a network architecture using a warm container and a proxy container executing a port address translation (PAT) gateway within a serverless function container VPC, according to some example embodiments. Referring to FIG. 2, there is illustrated the serverless function container VPC 120 which includes a serverless function container 202 and a PAT container 204 (with a PAT gateway) coupled to each other via a switch 210. Interconnections between various computing resources (e.g., containers 202 and 204) on different networks within the VPC 120 can take place via the virtual router 126. The serverless function container can also include runtime language libraries and binaries (LIB/BIN) 212, a network routing table (NRT) 214, and function code (FC) 216, as further described in connection with FIG. 3.

The PAT container 204 includes a first network interface (E0 206) attached to a sub-network associated with the serverless function container 202, and a second network interface (E1 208) attached to a sub-network associated with the user VPC 128.

The user VPC 128 can include a virtual machine 130 running a database service for user 106. As used herein, the term "PAT container" indicates a PAT gateway running in an application container, and the terms "PAT gateway" and "PAT container" can be used interchangeably.

Figure 3:
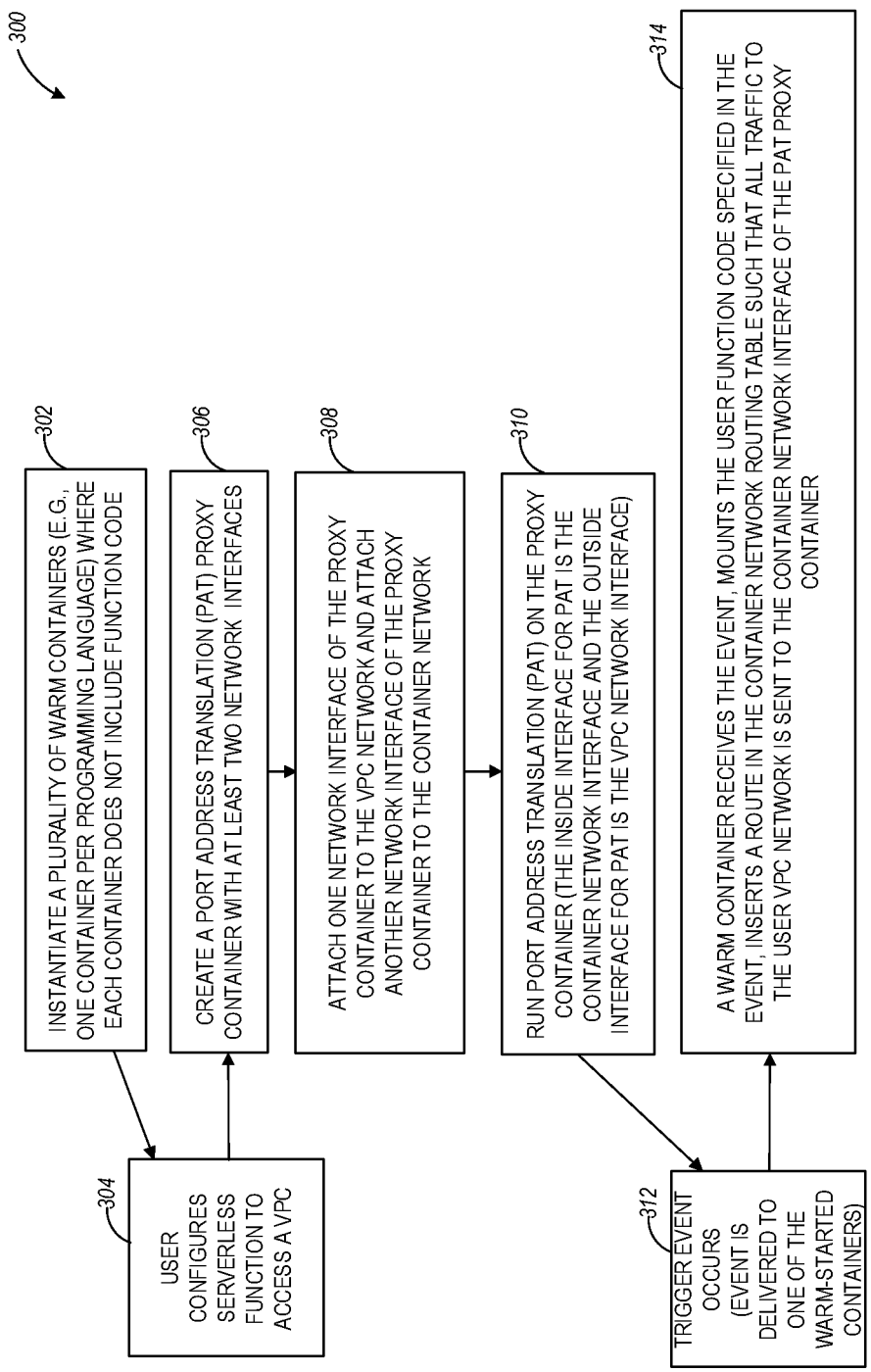
FIG. 3 is a flow diagram illustrating example functionalities for reducing serverless function startup latency, according to some example embodiments.

FIG. 3 is a flow diagram illustrating example functionalities 300 for reducing serverless function startup latency, according to some example embodiments. Referring to FIG. 2 and FIG. 3, at operation 302, a plurality of warm containers (e.g., one container per programming language) are instantiated within the network-based service architecture 114, where each instantiated warm container does not include function code. For example, a warm serverless function container 202 is instantiated within the serverless function container VPC 120. Upon instantiation, the warm serverless function container 202 includes only runtime language libraries and binaries (LIB/BIN) 212, without including any function code for a serverless function.

At operation 304, the user 106 configure a serverless function for accessing the user VPC 128. For example, the user 106 indicates a specific programming language to be used by the serverless function, and the serverless function container 202 is selected based on such configuration information (e.g., LIB/BIN 212 can correspond to the programming language selected by the user 106). Additionally, the user 106 can specify an event trigger and function code to be used in connection with the serverless function, as well as whether any data packets communicated in connection with the serverless function will need to access the user VPC 128. In some aspects, the function code 216 to be used in connection with the serverless function can be mounted within the event trigger 108 or the event trigger 108 can identify a location of the function code 216 to be used in connection with the serverless function.

In response to configuration of the serverless function, at operation 306, the PAT container 204 is instantiated within the serverless function container VPC 120. The PAT container 204 can be used to execute a PAT gateway, serving as a proxy gateway between the serverless function container 202 and the user VPC 128. In this regard, the PAT container 204 can also be referred to as a PAT proxy container. In some aspects, the PAT proxy container 204 is instantiated upon user configuration of the first serverless function that needs to access the user VPC 128. Additionally, a single PAT proxy container can be created for user within the network-based service infrastructure 114. In other aspects, the PAT proxy container 204 is instantiated before the user configuration of the serverless function at operation 304.

At operation 308, the first network interface 206 of the PAT proxy container 204 is attached to a sub-network associated with the serverless function container 202, and the second network interface 208 of the PAT proxy container 204 is attached to a sub-network associated with the user VPC 128. For example, the first network interface (E0) 206 of the PAT proxy container 204 is attached to a first sub-network associated with the serverless function container 202, and the second network interface (E1) 208 of the PAT proxy container 204 is attached to a second sub-network associated with the user VPC 128. The first network interface 206 can be associated with an IP address of 172.16.1.4 and a media access control (MAC) address (or destination address) of MAC_PAT_CON. The second network interface 208 can be associated with an IP address of 192.168.12.2 and a MAC address (or destination address) of MAC_PAT_TEN. As illustrated in FIG. 2, the interface 206 and the serverless function container 202 are on a first subnet (indicated by the same source IP address portions of 172.16.1.x), and the interface 208 and the user VPC 128 are also on a second subnet (indicated by the same source IP address portions of 192.168.12.x).

At operation 310, the PAT proxy container 204 performs port address translation functionalities for the user 106 configuring the serverless function at operation 304. For example, the PAT proxy container 204 can perform port address translation by changing source IP addresses of packets communicated between the first sub-network associated with the serverless function container 202 and the second sub-network associated with the user VPC 128.

At operation 312, a trigger event takes place and an event trigger for a serverless function is delivered to a serverless function container for the serverless function. For example, an event trigger 108 is received by the serverless function container VPC 120 within the network-based service infrastructure 114. At operation 314, the warm serverless function container 202 receives the event trigger 108, and function code 216 associated with the serverless function indicated by the event trigger 108 is mounted within the serverless function container 202. In a first aspect, the function code 216 can be communicated together with the event trigger 108. In a second aspect, the function code 216 can be retrieved from a code repository (not illustrated in FIG. 2) within the network-based service infrastructure 114, based on a description of the serverless function within the event trigger 108 or based on a location of the function code 214 specified within the event trigger 108.

After the function code 216 is mounted within the warm serverless function container 202, a route entry is inserted to a network routing table (NRT) such as NRT 214. More specifically, the NRT 214 is modified so that network traffic for the user VPC 128 is routed to network interface 206 of the PAT gateway within the PAT container 204. For example, the following Linux command can be used for adding a route within the NRT 214: -ip route add 192.168.12.6/32 via 172.16.1.4.

In some aspects, instead of inserting a route in the NRT 214, destination address rules can be added (e.g., using Linux iptables, OVS flows, and so forth) on the server (e.g., computing device 116) hosting the serverless function container 202 so that the MAC destination address of all traffic directed to the user VPC 128 is modified to match the MAC address of the container network interface (e.g., the MAC address for interface 206). For example, incoming network packets with a MAC (destination) address of MAC_VR (i.e., network packets for communication to the user VPC 128 via the router 126) will have their MAC address change through the MAC address (e.g., MAC_PAT_CON) of the first interface 206 of the PAT gateway within the PAT container 204. The PAT gateway then performs port address translation and packets received on interface 206 will have their MAC address changed to the MAC address of the user VPC 128 (e.g., MAC_A) so that such packets can be communicated to the user VPC 128 via the second interface 208 of the PAT gateway within the PAT container 204. In some aspects, the "insert" operation for the route entry can takes about 5 ms, and the total warm container instantiation time is thus reduced to less than 100 ms (compared to the 10 second latencies seen with AWS Lambda solutions which attach an ENI to a container).

In some aspects, during operation 314, a route entry is inserted to a network routing table within the virtual router 126 instead of inserting a route entry within the NRT 214 of the serverless function container 202. In this regard, packets addressed to the user VPC 128 and received at the router 126 can be forwarded to interface 206 of the PAT gateway within container 204, and then to the user VPC 128 via the interface 208 of the PAT gateway.

Figure 4:
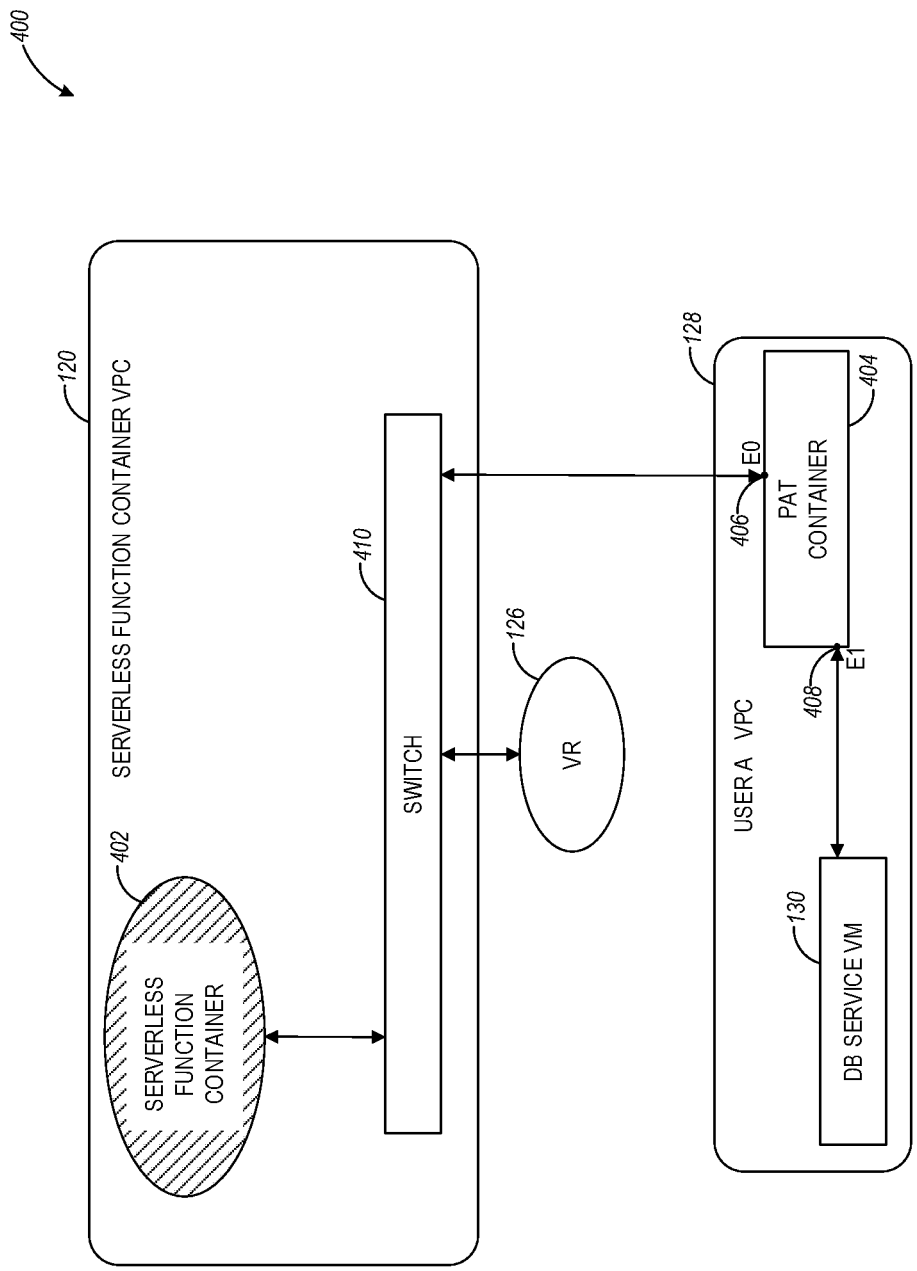
FIG. 4 is a block diagram illustrating a mechanism to reduce serverless function startup latency in a network architecture using a proxy container executing a PAT gateway within a user VPC, according to some example embodiments.

FIG. 4 is a block diagram 400 illustrating a mechanism to reduce serverless function startup latency in a network architecture using a proxy container executing a PAT gateway within a user VPC, according to some example embodiments. Referring to FIG. 4, there is illustrated the serverless function container VPC 120 in communication with the user VPC 128 via the router 126. The serverless function container VPC 120 can include a warm serverless function container 402, which can be the same as the warm serverless function container 202 of FIG. 2. Additionally, a PAT container 404 can be configured to run a PAT gateway similar to the PAT container 204 of FIG. 2. However, the PAT container 404 can be located within the user VPC 128 instead of the serverless function container VPC 120 as illustrated in FIG. 2.

The PAT container 404 can include a first network interface 406 coupled to a sub-network of the serverless function container 402 via the switch 410. The PAT container 404 can also include a second network interface 408 coupled to a sub-network associated with the database service VM 130 running within the user VPC 128. In this regard, after an event trigger (e.g., 108) is received and a new route entry is added to the NRT of the serverless function container 402, data packets to the user VPC 128 are communicated via the switch 410 and interface 406 to the PAT container 404 and then to the database service VM 130 via the interface 408, instead of being communicated via the switch 410 and the router 126 to the user VPC 128.

Figure 5:
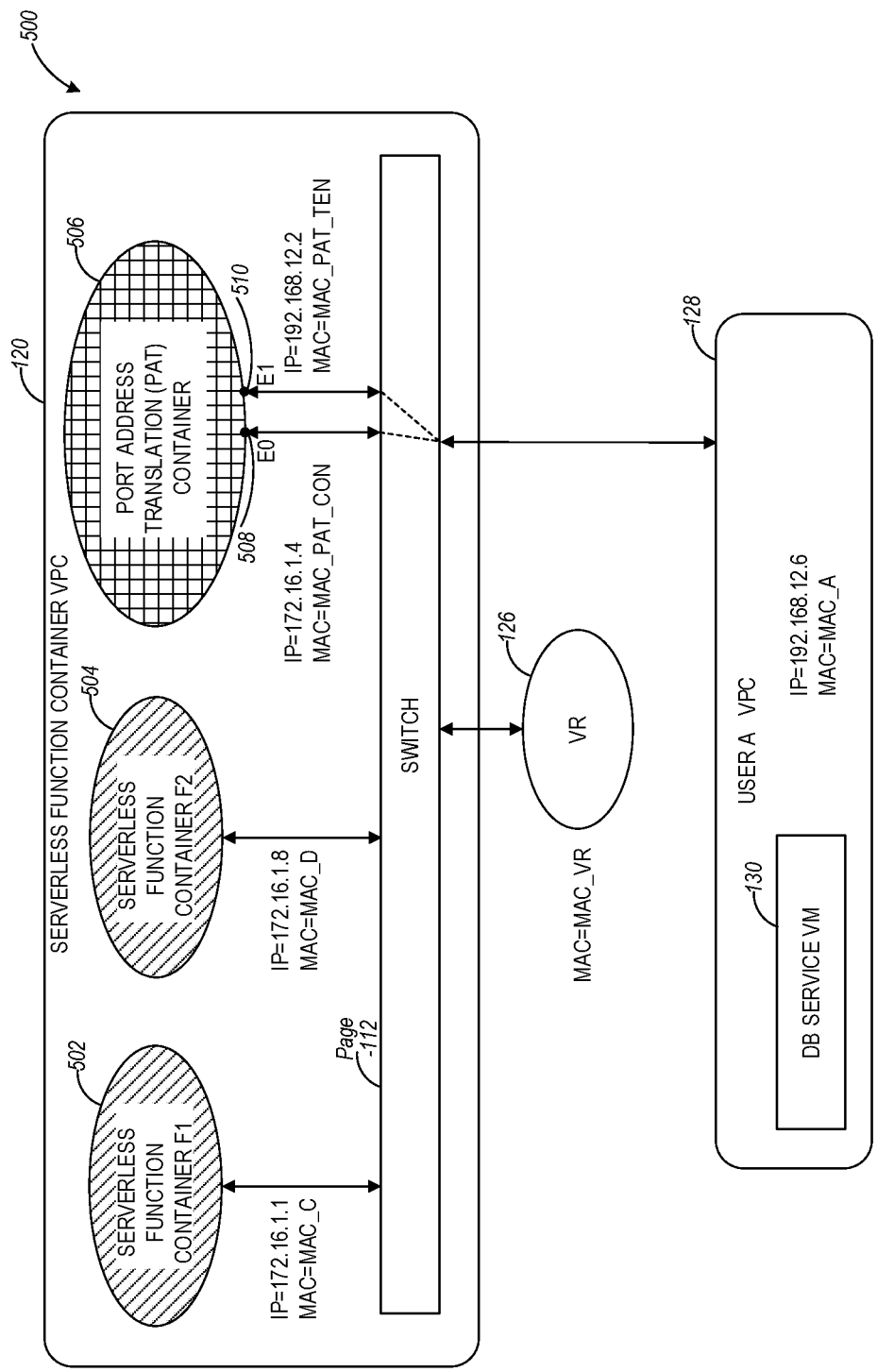
FIG. 5 is a block diagram illustrating a mechanism to reduce serverless function startup latency in a network architecture using multiple warm containers and a PAT gateway within a serverless function container VPC, according to some example embodiments.

FIG. 5 is a block diagram 500 illustrating a mechanism to reduce serverless function startup latency in a network architecture using multiple warm containers and a PAT gateway within a serverless function container VPC, according to some example embodiments. Referring to FIG. 5, there is illustrated the serverless function container VPC 120 which includes serverless function containers 502, 504 and a PAT container 506 (with a PAT gateway) coupled to each other via a switch 512. Interconnections between various computing resources (e.g., containers 502, 504, and 206) on different networks within the VPC 120 can take place via the virtual router 126. The user VPC 128 can include a virtual machine 130 running a database service for user 106.

Similar to the operations described in connection with FIGS. 2-3, a plurality of warm containers (e.g., warm containers 502 and 504) are instantiated within the network-based service architecture 114. For example, a warm serverless function container 502 is instantiated within the serverless function container VPC 120 for performing a first serverless function F1, and a warm serverless function container 504 is instantiated within the serverless function container VPC 120 for performing a second serverless function F2. Upon instantiation, the warm serverless function containers 502 and 504 include only runtime language libraries and binaries, without including any function code for the functions F1 and F2. The remainder of operations (e.g., operations associated with configuring serverless functions F1 and F2, mounting function code within the corresponding containers upon receipt of an event trigger, and inserting new routes in the NRTs of both serverless function containers to route network packets addressed to the user VPC 128 via the first interface 508 and the second interface 510 of the PAT container 506) is performed in a similar manner as discussed in connection with FIGS. 2-3.

In some aspects, the PAT container 506 performs port address translation functionalities by changing the source IP address of network packets received via interface 508. For example, a first network packet for the user VPC 128 is received at interface 508 from the first serverless function container 502 and having a source IP address of 172.16.1.1. A second network packet for the user VPC 128 is received at interface 508 from the second serverless function container 504 and having a source IP address of 172.16.1.8. The PAT container 506 can then change the source IP address of both packets to corresponding IP addresses of 192.168.12.2:1 and 192.168.12.2:2, indicating the same source IP address of the second interface 510 but different ports (e.g., port 1 and port 2) are used to forward the packets to the user VPC 128.

Figure 6:
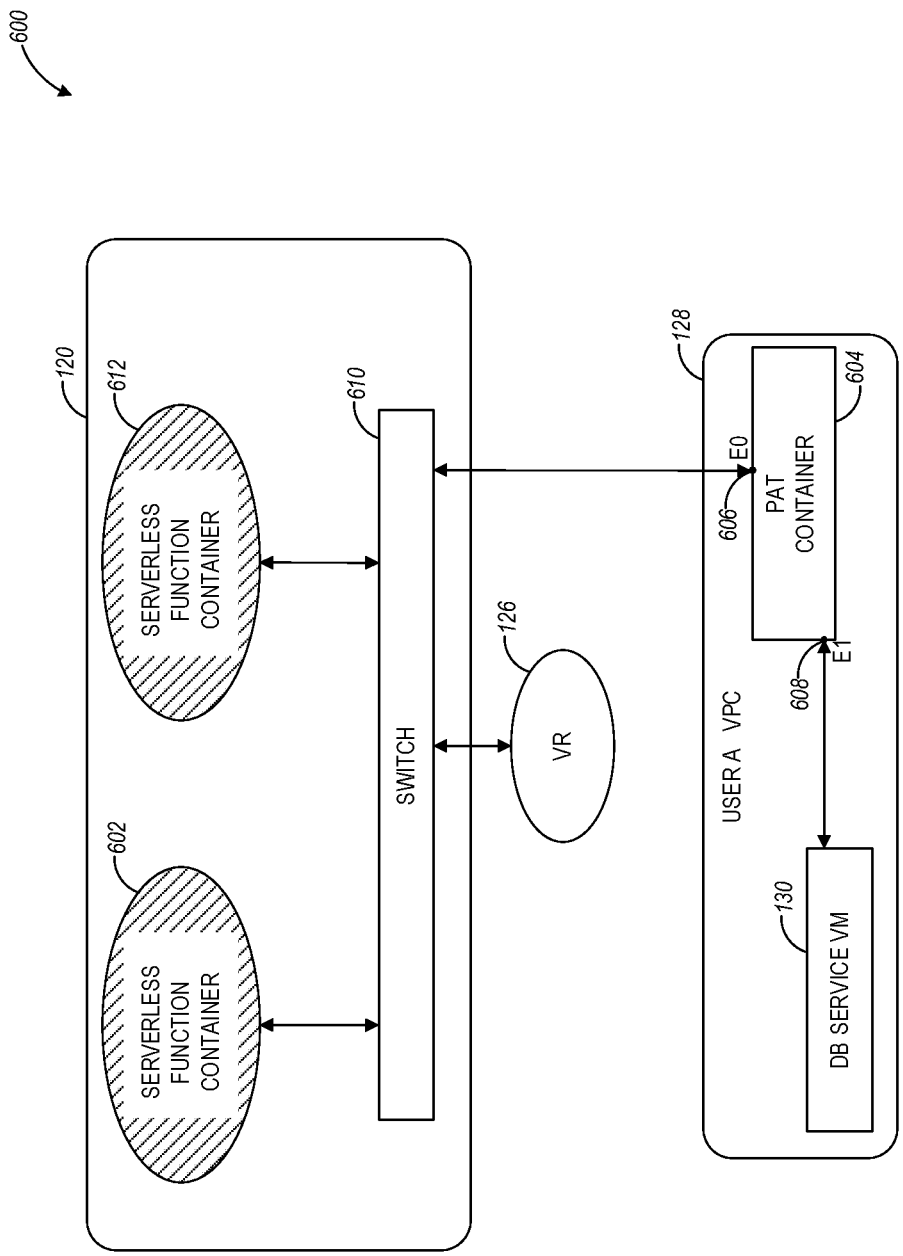
FIG. 6 is a block diagram illustrating a mechanism to reduce serverless function startup latency in a network architecture using multiple warm containers and a PAT gateway within a user VPC, according to some example embodiments.

FIG. 6 is a block diagram 600 illustrating a mechanism to reduce serverless function startup latency in a network architecture using multiple warm containers and a PAT gateway within a user VPC, according to some example embodiments. Referring to FIG. 6, there is illustrated the serverless function container VPC 120 in communication with the user VPC 128 via the router 126. The serverless function container VPC 120 includes warm serverless function containers 602 and 612, which can be the same as the warm serverless function containers 502 and 504 of FIG. 5. Additionally, a PAT container 606 is configured to run a PAT gateway similar to the PAT container 506 of FIG. 5 or 204 of FIG. 2. However, the PAT container 606 is located within the user VPC 128 instead of the serverless function container VPC 120 as illustrated in FIG. 2 and FIG. 5.

The PAT container 604 includes a first network interface 606 coupled to a sub-network of the serverless function containers 602 and 612 via the switch 610. The PAT container 604 also includes a second network interface 608 coupled to a sub-network associated with the database service VM 130 running within the user VPC 128. In this regard, after an event trigger (e.g., 108) is received and a new route entry is added to the NRT of the serverless function containers (e.g., 602), data packets to the user VPC 128 are communicated via the switch 610 and interface 606 to the PAT container 604 and then to the database service VM 130 via the interface 608, instead of being communicated via the switch 610 and the router 126 to the user VPC 128.

In some aspects, each of the serverless function containers 602 and 612 can be associated with serverless functions for the same or different users of the network-based service infrastructure 114. Additionally, after a serverless function is performed, a function code mounted within a corresponding warm serverless function container can be removed so that the warm container can be used for another function at a subsequent time (for the same or different user of the network-based service infrastructure 114).

Figure 7:
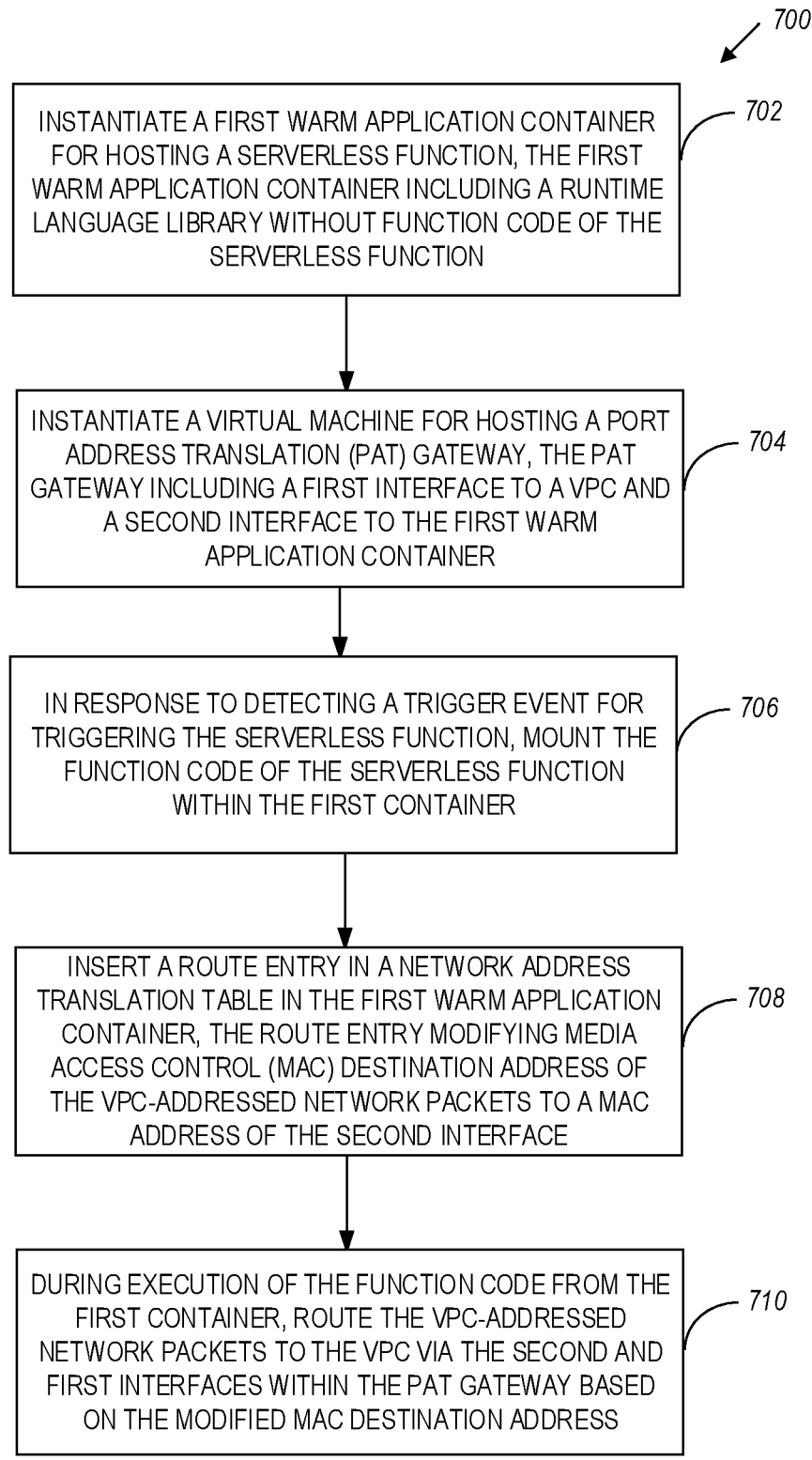
FIG. 7 is a flowchart of a method suitable for reducing serverless function startup latency in a network architecture, according to some example embodiments.

FIG. 7 is a flowchart of a method 700 suitable for reducing serverless function startup latency in a network architecture, according to some example embodiments. The method 700 includes operations 702, 704, 706, 708, and 710. By way of example and not limitation, the method 700 is described as being performed by the device 116 using the modules 860 and 862 of FIG. 8 (or modules 960 and 965 of FIG. 9). At operation 802, a first warm application container is instantiated for hosting a serverless function. For example, the warm serverless function container 202 can be instantiated within the serverless function container VPC 120. The first warm application container (e.g., 202) includes a runtime language library without function code of the serverless function. For example, and as illustrated in FIG. 2, upon instantiation, the warm serverless function container 202 only includes the runtime language libraries/binaries 212 without including function code.

At operation 704, a container or a virtual machine is instantiated for hosting a Port Address Translation (PAT) gateway. For example, container 204 is instantiated within the serverless function container VPC 120 to host a PAT gateway. The PAT gateway includes a first interface to the VPC and a second interface to the first warm application container. For example, the PAT container 204 includes interface 208 to the VPC 128 and interface 206 to the warm serverless function container 202.

At operation 706, in response to detecting a trigger event for triggering the serverless function, the function code of the serverless function his mounted within the first warm application container. For example, in response to receiving the event trigger 108, function code 214 is mounted within the serverless function container 202.

At operation 708, a route entry is inserted in a network routing table in the first warm application container. For example, a route entry can be inserted in the NRT 214 in the warm serverless function container 202. In some aspects, the route entry can modify media access control (MAC) destination address of the VPC-addressed network packets to a MAC address of the second interface.

At operation 710, during execution of the function code from the first warm application container, VPC-addressed network packets associated with the serverless function are routed to the VPC via the second interface and the first interface within the PAT gateway. For example, VPC addressed network packets associated with the serverless function running on the warm serverless function container 202 can be routed to interface 206 of the PAT container 204 and then to the user VPC 128 via the second interface 208 of the PAT container 204.

Figure 8:
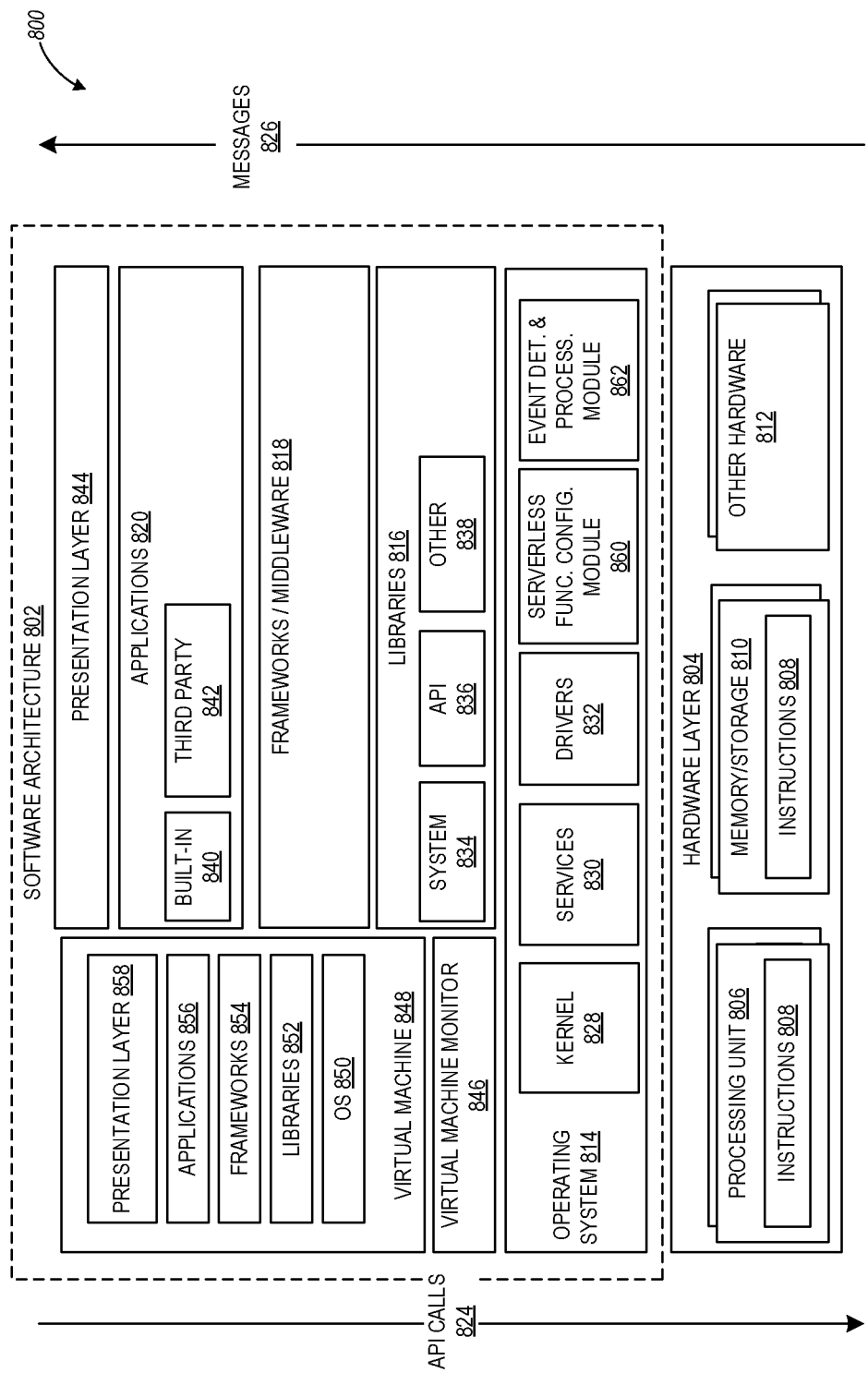
FIG. 8 is a block diagram illustrating a representative software architecture, which may be used in conjunction with various device hardware described herein, according to some example embodiments.

FIG. 8 is a block diagram illustrating a representative software architecture 800, which may be used in conjunction with various device hardware described herein, according to some example embodiments. FIG. 8 is merely a non-limiting example of a software architecture 802 and it will be appreciated that many other architectures may be implemented to facilitate the functionality described herein. The software architecture 802 may be executing on hardware such as device 900 of FIG. 9 that includes, among other things, processor 905, memory 910, storage 915 and 920, and I/O components 925 and 930. A representative hardware layer 804 is illustrated and can represent, for example, the device 900 of FIG. 9. The representative hardware layer 804 comprises one or more processing units 806 having associated executable instructions 808. Executable instructions 808 represent the executable instructions of the software architecture 802, including implementation of the methods, modules and so forth of FIGS. 1-7. Hardware layer 804 also includes memory and/or storage modules 810, which also have executable instructions 808. Hardware layer 804 may also comprise other hardware 812, which represents any other hardware of the hardware layer 804, such as the other hardware illustrated as part of device 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated in FIG. 8 are representative in nature and not all software architectures 802 have all layers. For example, some mobile or special purpose operating systems may not provide a frameworks/middleware 818, while others may provide such a layer. Other software architectures may include additional or different layers.

The operating system 814 may manage hardware resources and provide common services. The operating system 814 may include, for example, a kernel 828, services 830, drivers 832, a serverless function configuration module 860, and an event detection and processing module 862. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

In some aspects, the serverless function configuration module 860 may comprise suitable circuitry, logic, interfaces and/or code and can be configured to perform one or more of the functions discussed in connection with operations 302 through 310 in FIG. 3. For example, the serverless function configuration module 860 can be configured to instantiate the warm serverless function containers, create the PAT proxy container running a PAT gateway, attach network interfaces in the PAT gateway to sub-networks of a user VPC and a sub-network of the warm containers, perform Port address translation in connection with packets received at the PAT gateway, and so forth. The event detection and processing module 862 may comprise suitable circuitry, logic, interfaces and/or code and can be configured to perform one or more of the functions discussed in connection with operations 312 and 314 in FIG. 3. For example, the event detection and processing module 862 can be configured to detect the event trigger, mount the function code within the warm serverless function container, modify entries in a network routing table so that VPC-addressed network traffic is forwarded to the container VPC interface of the PAT gateway and then to the user of VPC via the second interface of the PAT gateway. The event detection and processing module 862 can also be configured to detect completion of the functionalities associated with a serverless function running in a warm container and remove (or unmount) the function code from the warm container so that the container can be reused in connection with another serverless function at a subsequent time.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830, drivers 832, and/or modules 860-862). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 (also sometimes referred to as middleware) may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system 814 or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830, drivers 832, and/or modules 860-862), libraries (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware machine (such as the device 900 of FIG. 9, for example). A virtual machine 848 is hosted by a host operating system (operating system 814 in FIG. 8) and typically, although not always, has a virtual machine monitor 846, which manages the operation of the virtual machine 848 as well as the interface with the host operating system (i.e., operating system 814). A software architecture 802 executes within the virtual machine 848 such as an operating system 850, libraries 852, frameworks/middleware 854, applications 856, and/or presentation layer 858. These layers of software architecture executing within the virtual machine 848 can be the same as corresponding layers previously described or may be different.

Figure 9:
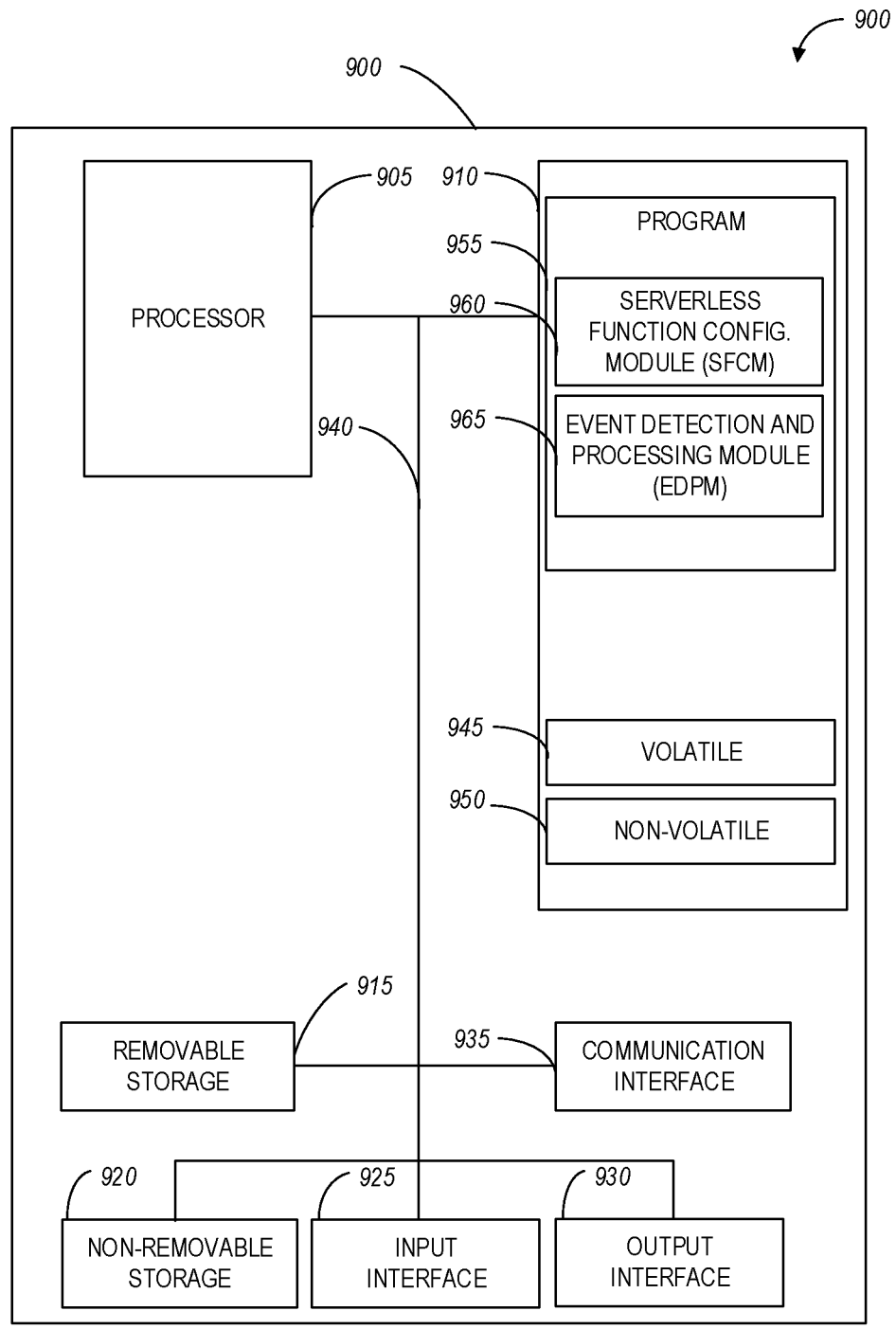
FIG. 9 is a block diagram illustrating circuitry for a device that implements algorithms and performs methods, according to some example embodiments.

FIG. 9 is a block diagram illustrating circuitry for a device that implements algorithms and performs methods, according to some example embodiments. All components need not be used in various embodiments. For example, clients, servers, and cloud-based network devices may each use a different set of components, or in the case of servers for example, larger storage devices.

One example computing device in the form of a computer 900 (also referred to as computing device 900, computer system 900, or computer 900) may include a processor 905, memory storage 910, removable storage 915, non-removable storage 920, input interface 925, output interface 930, and communication interface 935, all connected by a bus 940. Although the example computing device is illustrated and described as the computer 900, the computing device may be in different forms in different embodiments.

The memory storage 910 may include volatile memory 945 and non-volatile memory 950 and may store a program 955. The computer 900 may include—or have access to a computing environment that includes—a variety of computer-readable media, such as the volatile memory 945, the non-volatile memory 950, the removable storage 915, and the non-removable storage 920. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 955 stored in the memory 910) are executable by the processor 905 of the computer 900. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

The program 955 may utilize a customer preference structure using modules discussed herein, such as a serverless function configuration module 960 and an event detection and processing module 965. The serverless function configuration module 960 and the event detection and processing module 965 may be the same as the serverless function configuration module 860 and the event detection and processing module 862, respectively, as discussed in connection with at least FIG. 8.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, one or more of the modules 960-965 can be integrated as a single module, performing the corresponding functions of the integrated modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code or instructions to perform functions (e.g., by operating on input data and/or generating an output). Method steps can also be performed by, and apparatus for performing the methods can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors 905, such that the instructions, when executed by one or more processors 905, cause the one or more processors 905 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any and all modifications, variations, combinations or equivalents that fall within the scope of the present disclosure. Other aspects may be within the scope of the following claims.

What is claimed is:

1. A computer-implemented method for accessing a user virtual private cloud (VPC) using a serverless function within a network-based service infrastructure, wherein a user resource of a user is configured in the user VPC, and the first serverless function is used to access the user resource in the user VPC, the method comprising:
receiving first configuration information configured by the user;
configuring a first serverless function of the user based on the first configuration information, the first configuration information being used to determine a function code of the first serverless function, and to determine a first trigger event to be used in connection with the first serverless function, the first trigger event being used to trigger the first serverless function;

determining the user VPC for the first serverless function to access using the first configuration information;

instantiating a first computing resource, the first computing resource being used to host the first serverless function, the function code of the first serverless function is mounted within the first computing resource;

instantiating a proxy gateway, the proxy gateway comprising a first network interface connected to the first computing resource and a second network interface connected to the user VPC; and executing the function code of the first serverless function by the first computing resource in response to detecting the first trigger event for triggering the first serverless function.

2. The computer-implemented method of claim 1, wherein the function code of the first serverless function is executed by the first computing resource in response to detecting the first trigger event for triggering the first serverless function.

3. The computer-implemented method of claim 1, wherein the method further comprising:

during execution of the function code in the first computing resource, routing network packets from the first computing resource addressed to the user VPC associated with the first serverless function to the first network interface of the proxy gateway, wherein the network packets from the first computing resource addressed to the user VPC and associated with the first serverless function are received at the first network interface of the proxy gateway, and the network packets from the first computing resource addressed to the user VPC associated with the first serverless function are forwarded by the second network interface of the proxy gateway to the user VPC.

4. The computer-implemented method of claim 3, wherein the first network interface is further connected to a second computing resource, the second computing resource is used to host a second serverless function, the function code of the second serverless function is mounted within the second computing resource, the function code of the second serverless function is executed by the second computing resource, and the method further comprising:

during execution of the function code in the second computing resource, routing network packets from the second computing resource addressed to the user VPC associated with the second serverless function to the first network interface of the proxy gateway, wherein the network packets from the second computing resource addressed to the user VPC associated with the second serverless function are forwarded by the second network interface of the proxy gateway to the user VPC.

5. The computer-implemented method of claim 4, wherein before the function code of the second serverless function is executed by the second computing resource, the method further comprising:

receiving second configuration information;

configuring the second serverless function based on the second configuration information;

wherein the second configuration information is used to determine the user VPC for the second serverless function to access a function code of the second serverless function, and a second trigger event to be used in connection with the second serverless function, wherein the second trigger event is used to trigger the second serverless function, and the function code of the second serverless function is executed by the second computing resource in response to detecting the second trigger event for triggering the second serverless function.

6. The computer-implemented method of claim 4, wherein the first computing resource and the second computing resource are configured in a serverless function VPC.

7. The computer-implemented method of claim 6, wherein the first network interface is coupled to the serverless function VPC.

8. The computer-implemented method of claim 7, wherein the first network interface is attached to a subnet of the serverless function VPC.

9. The computer-implemented method of claim 4, wherein the first serverless function and the second serverless function are associated with a same user of the network-based service infrastructure.

10. The computer-implemented method of claim 4, wherein the first serverless function and the second serverless function are associated with different users of the network-based service infrastructure.

11. The computer-implemented method of claim 4, further comprising:

instantiating the proxy gateway during a configuration time of the first serverless function or before configuring the first serverless function or before the first trigger event takes place.

12. The computer-implemented method of claim 4, wherein the second network interface is associated with an IP address of a subnet of the user VPC, the network packets from the first computing resource addressed to the user VPC associated with the first serverless function received at the first network interface and the network packets from the second computing resource addressed to the user VPC associated with the second serverless function received at the first network interface are performed source address translation by the proxy gateway before being forwarded by the second network interface to the user VPC, and after being performed source address translation by the proxy gateway, the network packets from the first computing resource addressed to the user VPC associated with the first serverless function received at the first network interface and the network packets from the second computing resource addressed to the user VPC associated with the second serverless function received at the first network interface are forwarded, by the second network interface, to the user VPC.

13. The computer-implemented method of claim 12, wherein:

a source IP address of the network packets from the first computing resource addressed to the user VPC associated with the first serverless function received at the first network interface is translated, by the proxy gateway, into the IP address of the subnet of the user VPC and associated with the second network interface;

a source port of the network packets from the first computing resource addressed to the user VPC associated with the first serverless function received at the first network interface is translated, by the proxy gateway, into a first port; and after being translated by the proxy gateway, the network packets from the first computing resource addressed to the user VPC associated with the first serverless function are forwarded, by the second network interface, to the user VPC.

14. The computer-implemented method of claim 13, wherein:

a source IP address of the network packets from the second computing resource addressed to the user VPC associated with the second serverless function received at the first network interface is translated, by the proxy gateway, into the IP address of the subnet of the user VPC associated with the second network interface;

a source port of the network packets from the second computing resource addressed to the user VPC associated with the second serverless function received at the first network interface is translated, by the proxy gateway, into a second port; and after being translated by the proxy gateway, the network packets from the second computing resource addressed to the user VPC associated with the second serverless function are forwarded, by the second network interface, to the user VPC.

15. The computer-implemented method of claim 13, further comprising:

instantiating an additional computing resource to scale the first computing resource in response to detecting a burst of first trigger events for triggering the first serverless function, wherein the function code of the first serverless function is mounted within the additional computing resource, the function code of the first serverless function is executed by the additional computing resource, and the first network interface is further connected to the additional computing resource.

16. The computer-implemented method of claim 15, wherein:

a source IP address of the network packets from the additional computing resource addressed to the user VPC associated with the first serverless function received at the first network interface is translated, by the proxy gateway, into the IP address of the subnet of the user VPC associated with the second network interface;

a source port of the network packets from the additional computing resource addressed to the user VPC associated with the first serverless function received at the first network interface is translated, by the proxy gateway, into a third port; and after being translated by the proxy gateway, the network packets from the additional computing resource addressed to the user VPC associated with the first serverless function are forwarded, by the second network interface, to the user VPC.

17. The computer-implemented method of claim 1, further comprising:

instantiating the first computing resource when the first trigger event for triggering the first serverless function takes place or before the first trigger event for triggering the first serverless function takes place, wherein the first computing resource comprises a runtime language library and the function code of the first serverless function.

18. The computer-implemented method of claim 1, further comprising:

instantiating the first computing resource before the first trigger event for triggering the first serverless function takes place, wherein the first computing resource comprises a runtime language library without the function code of the first serverless function;

mounting the function code of the first serverless function within the first computing resource in response to detecting the first trigger event for triggering the first serverless function.

19. The computer-implemented method of claim 1, wherein the first computing resource is implemented by a virtual machine or a container.

20. The computer-implemented method of claim 1, wherein the user resource comprises a virtual machine.

21. The computer-implemented method of claim 20, wherein a database service is run in the virtual machine.

22. A device comprising:

a memory that stores instructions; and one or more processors in communication with the memory, wherein the one or more processors execute the instructions to:

receive first configuration information configured by a user;

configure a first serverless function of the user based on the first configuration information, the first configuration information being used to determine a function code of the first serverless function, and to determine a first trigger event to be used in connection with the first serverless function, the first trigger event being used to trigger the first serverless function;

determining a user virtual private cloud (VPC) for the first serverless function to access using the first configuration information, a user resource of the user being configured in the user VPC, and the first serverless function being used to access the user resource in the user VPC;

instantiate a first computing resource, the first computing resource being used to host the first serverless function, the function code of the first serverless function is mounted within the first computing resource;

instantiate a proxy gateway, the proxy gateway comprising a first network interface connected to the first computing resource and a second network interface connected to the user VPC; and executing the function code of the first serverless function by the first computing resource in response to detecting the first trigger event for triggering the first serverless function.

23. The device of claim 22, wherein the function code of the first serverless function is executed by the first computing resource in response to detecting the first trigger event for triggering the first serverless function.

24. The device of claim 22, wherein the one or more processors further execute the instructions to:

during execution of the function code in the first computing resource, route network packets from the first computing resource addressed to the user VPC associated with the first serverless function to the first network interface of the proxy gateway, wherein the network packets from the first computing resource addressed to the user VPC associated with the first serverless function are received at the first network interface, and the network packets from the first computing resource addressed to the user VPC associated with the first serverless function are forwarded by the second network interface of the proxy gateway to the user VPC.

25. The device of claim 22, wherein the first network interface is further connected to a second computing resource, the second computing resource is used to host a second serverless function, the function code of the second serverless function is mounted within the second computing resource, the function code of the second serverless function is executed by the second computing resource, wherein the one or more processors execute the instructions to:
  during execution of the function code in the second computing resource, route network packets from the second computing resource addressed to the user VPC associated with the second serverless function to the first network interface of the proxy gateway, wherein the network packets from the second computing resource addressed to the user VPC associated with the second serverless function are forwarded by the second network interface of the proxy gateway to the user VPC.

26. The device of claim 25, wherein before the function code of the second serverless function is executed by the second computing resource, the one or more processors execute the instructions to:
  receive second configuration information; and
  configure the second serverless function based on the second configuration information;
  wherein the second configuration information is used to determine the user VPC for the second serverless function to access a function code of the second serverless function, and a second trigger event to be used in connection with the second serverless function, wherein the second trigger event is used to trigger the second serverless function, and the function code of the second serverless function is executed by the second computing resource in response to detecting the second trigger event for triggering the second serverless function.

27. The device of claim 25, wherein the first computing resource and the second computing resource are configured in a serverless function VPC.

28. The device of claim 27, wherein the first network interface is coupled to the serverless function VPC.

29. The device of claim 28, wherein the first network interface is attached to a subnet of the serverless function VPC.

30. The device of claim 25, wherein the first serverless function and the second serverless function are associated with a same user of a network-based service infrastructure.

31. The device of claim 25, wherein the first serverless function and the second serverless function are associated with different users of a network-based service infrastructure.

32. The device of claim 25, wherein the second network interface is associated with an IP address of a subnet of the user VPC, the network packets from the first computing resource addressed to the user VPC associated with the first serverless function received at the first network interface and the network packets from the second computing resource addressed to the user VPC associated with the second serverless function received at the first network interface are performed source address translation by the proxy gateway before being forwarded by the second network interface to the user VPC, and after being performed source address translation by the proxy gateway, the network packets from the first computing resource addressed to the user VPC associated with the first serverless function received at the first network interface and the network packets from the second computing resource addressed to the user VPC associated with the second serverless function received at the first network interface are forwarded, by the second network interface, to the user VPC.

33. The device of claim 32, wherein:
  a source IP address of the network packets from the first computing resource addressed to the user VPC associated with the first serverless function received at the first network interface is translated, by the proxy gateway, into the IP address of the subnet of the user VPC associated with the second network interface;
  a source port of the network packets from the first computing resource addressed to the user VPC associated with the first serverless function received at the first network interface is translated, by the proxy gateway, into a first port; and
  after being translated by the proxy gateway, the network packets from the first computing resource addressed to the user VPC associated with the first serverless function are forwarded, by the second network interface, to the user VPC.

34. The device of claim 33, wherein:
  a source IP address of the network packets from the second computing resource addressed to the user VPC associated with the second serverless function received at the first network interface is translated, by the proxy gateway, into the IP address of the subnet of the user VPC associated with the second network interface;
  a source port of the network packets from the second computing resource addressed to the user VPC associated with the second serverless function received at the first network interface is translated, by the proxy gateway, into a second port; and
  after being translated by the proxy gateway, the network packets from the second computing resource addressed to the user VPC associated with the second serverless function are forwarded, by the second network interface, to the user VPC.

35. The device of claim 33, wherein the one or more processors execute the instructions to:
  instantiate an additional computing resource to scale the first computing resource in response to detecting a burst of first trigger events for triggering the first serverless function, wherein the function code of the first serverless function is mounted within the additional computing resource, the function code of the first serverless function is executed by the additional computing resource, and the first network interface is further connected to the additional computing resource.

36. The device of claim 35, wherein:
  a source IP address of the network packets from the additional computing resource addressed to the user VPC associated with the first serverless function received at the first network interface is translated, by the proxy gateway, into the IP address of the subnet of the user VPC associated with the second network interface;
  a source port of the network packets from the additional computing resource addressed to the user VPC associated with the first serverless function received at the first network interface is translated, by the proxy gateway, into a third port; and
  after being translated by the proxy gateway, the network packets from the additional computing resource addressed to the user VPC associated with the first serverless function are forwarded, by the second network interface, to the user VPC.

37. The device of claim 33, wherein the one or more processors execute the instructions to:
  instantiate the first computing resource when the first trigger event for triggering the first serverless function takes place or before the first trigger event for triggering the first serverless function takes place, wherein the first computing resource comprises a runtime language library and the function code of the first serverless function.

38. The device of claim 33, wherein the one or more processors execute the instructions to:
   instantiate the first computing resource before the first trigger event for triggering the first serverless function takes place, wherein the first computing resource comprises a runtime language library without the function code of the first serverless function; and
   mount the function code of the first serverless function within the first computing resource in response to detecting the first trigger event for triggering the first serverless function.

39. The device of claim 33, wherein the first computing resource is implemented by a virtual machine or a container.

40. The device of claim 22, wherein the one or more processors execute the instructions to:
   instantiate the proxy gateway during a configuration time of the first serverless function or before configuring the first serverless function or before the first trigger event takes place.

\* \* \* \* \*